United States Patent [19]

Abthoff et al.

[11] Patent Number: 5,259,813
[45] Date of Patent: Nov. 9, 1993

[54] DEVICE FOR CONTROLLING THE VENTILATION OF AN INTERNAL SPACE, PARTICULARLY IN MOTOR VEHICLES

[75] Inventors: Jörg Abthoff, Plüderhausen; Hans-Dieter Schuster, Schorndorf; Friedhelm Nunnemann, Winnenden; Gunter Loose, Remseck; Michael Oβwald, Ludwigsburg; Michael-Rainer Busch, Ebersbach; Markus Fortkord, Waiblingen, all of Fed. Rep. of Germany

[73] Assignee: Mercedes-Benz AG, Fed. Rep. of Germany

[21] Appl. No.: 841,189

[22] Filed: Feb. 26, 1992

[30] Foreign Application Priority Data

Feb. 27, 1991 [DE] Fed. Rep. of Germany ....... 4106078

[51] Int. Cl.$^5$ ............................................. B60H 3/06
[52] U.S. Cl. ....................................... 454/75; 454/139
[58] Field of Search ............... 454/75, 139, 143, 146, 454/148

[56] References Cited

U.S. PATENT DOCUMENTS

| 4,458,583 | 7/1984 | Fukui et al. | 454/75 |
| 4,742,763 | 5/1988 | Hölter et al. | 454/75 |

FOREIGN PATENT DOCUMENTS

| 3446082 | 6/1986 | Fed. Rep. of Germany | 454/75 |
| 3731745 | 4/1989 | Fed. Rep. of Germany | . |
| 3526462 | 7/1990 | Fed. Rep. of Germany | . |
| 177708 | 10/1983 | Japan | 454/75 |
| 8518 | 1/1984 | Japan | 454/75 |
| 135818 | 6/1986 | Japan | 454/75 |

Primary Examiner—Harold Joyce
Attorney, Agent, or Firm—Evenson, McKeown, Edwards & Lenahan

[57] ABSTRACT

The quality of the external air is determined by means of a pollutant sensor. The quality of the internal air is determined by calculation taking account of the air quantities introduced from outside into the internal space. A decision between air supply operation and air recirculation operation is then made on the basis of a comparison of the air qualities inside and outside. The pollutant sensor is preferably located in a casing whose internal space is accessible to gases through an opening which is preferably sealed by a gas-permeable membrane.

12 Claims, 3 Drawing Sheets

DEVICE FOR CONTROLLING THE VENTILATION OF AN INTERNAL SPACE, PARTICULARLY IN MOTOR VEHICLES

BACKGROUND AND SUMMARY OF THE INVENTION

The invention concerns a device for controlling the ventilation of an internal space, particularly in motor vehicles, as a function of signals of a pollutant sensor essentially subjected only to external air, having switch-over between air supply operation and air recirculation operation depending on the pollutant concentration.

Generally speaking, fresh air from outside should be continuously supplied to the passenger compartment of motor vehicles during the journey in order to avoid the possibility of the carbon dioxide content in the air increasing excessively in the internal space due to the breathing of the people in the internal space and leading to tiredness symptoms among those travelling. In addition, the moisture content of the air in the internal space would also increase in an undesirable manner without the supply of fresh air.

On the other hand, it is often useful to stop or switch off the supply of fresh air, i.e., the "air supply operation" and therefore to switch to "air recirculation operation" in which the air in the internal space is only circulated around by convection or by a fan.

The switch-over from air supply operation to air recirculation operation generally takes place in motor vehicles by means of an air butterfly which, in its air supply position, connects the inlet end of a fan (whose outlet end is connected to the internal space) to an external air connection and, in its air circulation position, connects it to an internal space connection.

In this connection, it is known to undertake the switch-over between air supply operation and air recirculation operation automatically as a function of the signals from a pollutant sensor which is subjected to external air and generates signals which are correlated with the pollutant concentration in the external air.

It is also known from German Patent Document 37 31 745 to continuously record the signals from the external air pollutant sensor and to determine from them a continually updated average value for the external air pollutant concentration. This average value is used as the reference value for a comparison with the current actual value of the external air pollutant concentration. If the current actual value indicates an actual pollutant concentration which exceeds the average or reference value for the pollutant concentration by a specified amount, air recirculation operation is switched on. Otherwise, air supply operation takes place. This known method of control is not satisfactory because the pollutant concentration of the internal air cannot be taken into account at all. In particular, the fact that the air in the internal space can deteriorate substantially during long periods of air recirculation operation is ignored with the result that the quality of the internal air can finally be lower than the possibly relatively poor quality of the external air. No account is taken of this, however, in the decision between air supply operation and air recirculation operation.

From German Patent Document 35 26 462, it is known to arrange a pollutant sensor for the external air, on the one hand, and a pollutant sensor for the internal air, on the other, in order to decide, by comparing the pollutant concentrations determined in the external air and the internal air, whether air supply operation or air recirculation operation is more advantageous in terms of the quality of the internal air and which at these operations should, therefore, be switched on.

It is not possible to achieve such arrangements in practice or at least not at a justifiable expense. This is mainly due to the fact that the signals of conventional pollutant sensors are affected by very many parameters and not just the pollutant concentration in the surroundings of the particular sensor. Conventional pollutant sensors exploit the effect that typical air pollutants, such as the oxides of carbon and nitrogen, penetrate to different amounts into electrically conductive ceramic bodies as a function of their concentration in the air and therefore change the electrical resistance of the ceramic body. This effect depends greatly on temperature. In order to have the electrical resistance values change sufficiently clearly with fluctuating pollutant concentration, the ceramic body must be held at a relative high operating temperature by means of a heating element. Even so, markedly different surface temperatures can occur on the ceramic body depending on whether the ceramic body is subjected to very cold or warm air and whether or not the air has a high flow velocity relative to the ceramic body. In addition, the surface temperature of the ceramic body and the ability of the pollutants to penetrate into the ceramic body are also modified by the humidity of the air, which may very greatly under certain circumstances. The result of this is that pollutant sensors installed at different positions can also generate markedly different signals even when the concentration of the pollutants being monitored is the same in the vicinity of both sensors. On the other hand, equal signals from pollutant sensors installed at different locations by no means indicate that the pollutant concentrations at the different locations are also equal. It follows that the signals of two sensors located at different positions cannot be compared directly.

A comparison between the signals of the pollutant sensor for the external air and the signals of the pollutant sensor for the internal air would therefore only be possible if account is taken of the different environmental influences on the two sensors. Although this could theoretically be done, it is not practical. In the case of motor vehicles, a comparison is further complicated by the fact that extraordinarily large changes in the air temperature, the air humidity and the flow velocity of the air can occur both in the external space and in the internal space. Furthermore, other parameters have to be taken into account in addition to those just mentioned if the signals of two sensors are to be compared.

An object of the invention is to provide a practical device which takes account of both the quality of the external air and the quality of the internal air in the control of the ventilation of an internal space.

This and other objects are achieved in a device for controlling the ventilation of an internal space of a motor vehicle by means of a computer—and taking account of the sensor signals of the pollutant sensor for the external air, the current mode of operation—air supply operation or air recirculation operation—and specified experience values which can be called up—a first quantity correlated with the pollutant concentration in the internal space is determined and is compared with a second quantity correlated with the pollutant concentration in the external air and derived from the sensor signals, and that either air supply operation or air recirculation operation is switched on or retained depending on the result of this comparison.

The invention is based on the general idea that appropriate tests performed by one of ordinary skill in the art make it possible to determine "experience values" for a tendency of the air quality in the internal space to deteriorate with air recirculation operation and for a delayed and/or weakened equalization between the air quality in the internal space and the air quality of the external air occurring in the case of air supply operation. If these experience values are called upon by the computer, it is immediately possible to determine values for the quality of the internal air by computation —i.e. by computer simulation—from the sensor signals of the pollutant sensor for the external air, i.e. from signals which reproduce the quality of the external air.

The invention therefore uses the fact that the computer "knows", on the basis of the experience values which it can call upon, how the fresh air introduced into the internal space in the case of air supply operation mixes with the air present in the internal space and therefore equalizes, with a delay, the air quality in the internal space and the air quality in the external space and how the quality of the air in the internal space deteriorates with air recirculation operation relative to the condition at the beginning of the air recirculation operation due to the breathing of the occupants.

On the one hand, therefore, the invention takes account of the fact that the quality of the air in the internal space depends markedly on the quality of the air in the external space. On the other hand, the typical deviations of the quality of the air in the internal space from the quality of the air in the external space can be determined by means of the computer because the latter has access to corresponding experience values.

Because the signal reproducing the quality of the air in the internal space is generated by means of the computer, it is immediately possible to ensure that the signal for the quality of the internal air is formed or structured corresponding to the signals reproducing the pollutant concentration of the external air and represents a fictitious external air pollutant concentration at which the current quality of the internal air remains unaltered.

For this purpose, the experience values for the deviation of the quality of the internal air from the quality of the external air only need to be formed as factors (dependent on time and operating condition) with which the value or the corresponding signal reproducing the external air quality is associated as a mathematical product.

The computer therefore only has to have access to corresponding time-dependent factors in order to determine, by product formation, a signal for the internal air quality from the signal for the external air quality.

With respect to high measurement accuracy—and not only in the method according to the invention and the device according to the invention—it is desirable for the pollutant sensor for the external air to be arranged so that it is protected against air draughts and dripping water in a chamber whose walls—at least in some areas— are permeable to gases and to the pollutants which have to be monitored.

It is then useful for one wall area to be closed by a gas-permeable membrane; the other wall areas are, in contrast, gas-tight and liquid-tight. A mat may, if appropriate, also be used instead of a membrane.

Because of this arrangement, the pollutant concentration in the chamber changes practically simultaneously with the pollutant concentration in the external air. It is, however, advantageous to avoid the pollutant sensor being subjected, because of different travelling speeds or variable weather, to air flowing at different speeds and/or spray water or mist droplets and producing greatly varying signals due only to a change in these parameters.

Other objects, advantages and novel features of the present invention will become apparent from the following detailed description of the invention when considered in conjunction with the accompanying drawings.

DETAILED DESCRIPTION OF THE DRAWINGS

Figure 1:
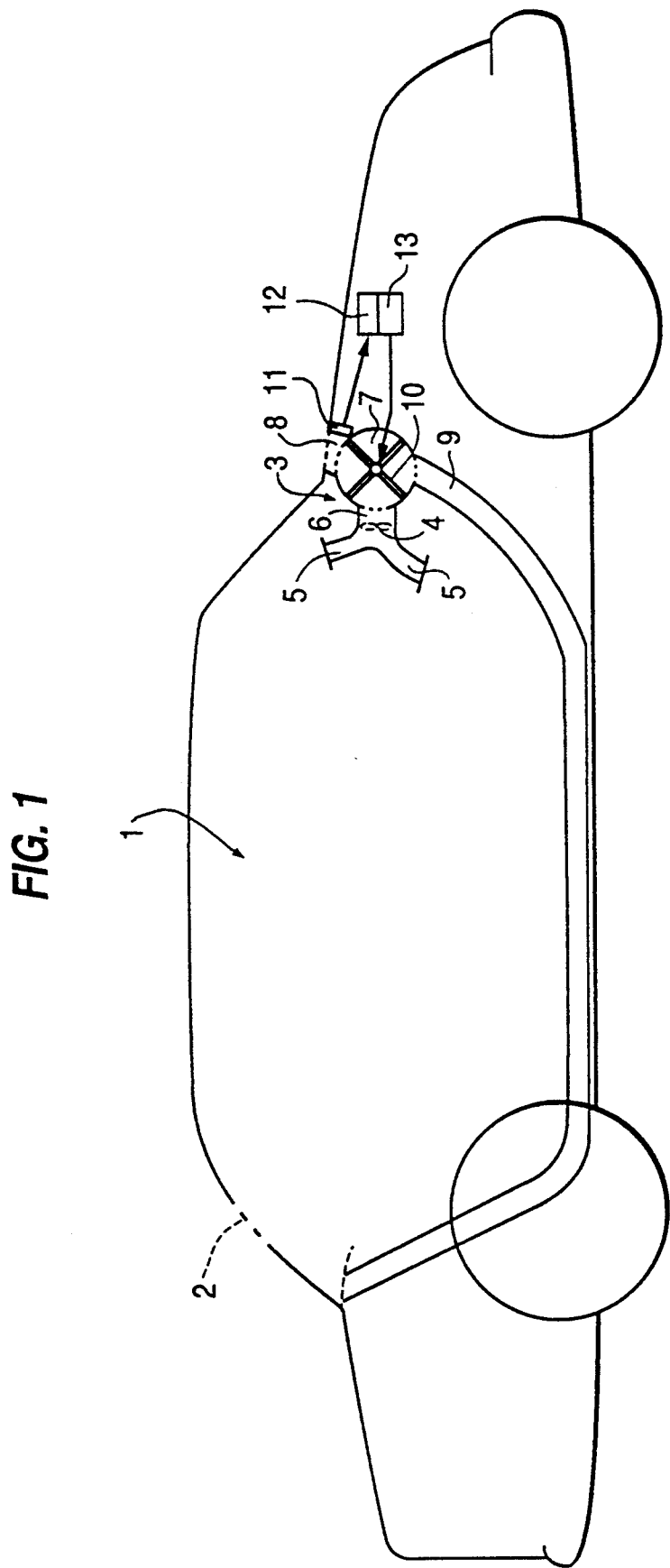
FIG. 1 shows a diagrammatically represented motor vehicle with a ventilation and air recirculation system for the internal space embodied in accordance with the invention.

The internal space 1 of the passenger motor vehicle shown diagrammatically in FIG. 1 has, in fundamentally known manner, ventilation openings 2 which are arranged or designed in known manner so that when the vehicle is travelling it is practically only possible for an air flow to occur in the ventilation direction. This can be ensured for example by non-return valves or by utilizing the low pressure which is generated by the air flowing around the vehicle in the region of the ventilation openings when the vehicle is moving.

A ventilation system 3 with a fan 4, which is connected at the outlet end via outlet nozzles 5 to the internal space 1 and is connected at the inlet end via an induction conduit 6 to an inlet chamber 7, is used for the supply of fresh air to the internal space 1. The inlet chamber 7 is connected, via an inlet duct 8, to the outside of the vehicle and is connected, via an inlet duct 9, to the internal space 1 of the vehicle. An adjustable butterfly 10 is arranged within the inlet chamber 7 in such a way that the induction conduit 6 is connected, in the butterfly 10 air supply position shown, to the inlet duct 8 leading to the outside of the vehicle and, in the air recirculation position shown chain-dotted, to the inlet duct 9 connected to the internal space 1. In the air supply position, therefore, fresh air is blown from the outside of the vehicle into the internal space 1. In the air recirculation position, the air in the internal space 1 can only be recirculated by means of the fan and access of fresh air into the internal space is prevented by the butterfly 10. The recirculation position is shown chain-dotted. If required, an air-conditioning system (not shown) can also be arranged in the flow path of the air behind the fan 4, for example.

A pollutant sensor 11 is located on the inlet duct 8 or at another location which can easily be reached by the air outside the vehicle. The signals from the pollutant sensor 11 change in a manner corresponding to the pollutant concentration in the air outside the vehicle (external air) and are supplied to the computer 12 of a computer-controlled setting device 13 for the butterfly 10. The computer 12 is also supplied with a further signal which changes in a manner corresponding to the output of the fan 4. If, for example, the fan 4 is to be driven at different speeds by means of an electric motor, the motor's electrical supply voltage, which varies with its speed, can be used as such a signal.

In accordance with the invention, the computer 12 has to actuate the butterfly 10 by means of the setting device 13 controlled by it in such a way that butterfly 10 is switched over in an optimum fashion between the air supply and the air recirculation positions. In other words the butterfly 10 should always be switched to that position at which the pollutant concentration of the internal air remains optimally small.

For this purpose, the computer must "know" the magnitude of the pollutant concentration of the internal air as compared with the pollutant concentration of the external air.

In accordance with the invention, no additional pollutant sensor is employed for this purpose in the internal space 1. Instead, the computer 12 calculates, in the manner described below, how the pollutant concentration of the internal air changes relative to the pollutant concentration of the external air.

In this process, the following facts are taken into account:

If the pollutant concentration in the external air remains constant, the pollutant concentration of the internal air in the case of air supply operation will—after a certain interval of time—become equal to the corresponding value for the external air. If the pollutant concentration of the external air changes during the journey, the pollutant concentration of the internal air will also change correspondingly during air supply operation, although with a certain delay. The magnitude of the delay depends essentially on the output of the fan 4 and can be determined by tests. The corresponding data can be stored in the computer 12 or in an associated memory in such a way that it can be called up by the computer 12, so that the latter is in a position, in the case of air supply operation, to determine the pollutant concentration of the internal air on the basis of the signals for the pollutant concentration of the external air emitted by the pollutant sensor 11.

Corresponding conditions also apply for air recirculation operation. It is possible to determine by series of tests the manner in which the air quality in the internal space 1 deteriorates due to the breathing of the passengers after air recirculation operation is switched on. It is then also possible to take account of the subjective perceptions of the passengers, who usually find air recirculation operation to be unpleasant when it has been maintained for a long time. Thus, instead of the actual increase in the pollutant concentration in the case of air recirculation operation, an embodiment of the invention also takes account of or determines the supposed increase in the pollutant concentration of the internal air. If these experience values are also made available to the computer 12 in an accessible form, it is also possible to determine a value for the (actual or supposed) pollutant concentration of the internal air by means of the computer 12 in the case of air recirculation operation. This is done by changing, as a function of time, the last value of the pollutant concentration of the internal air determined before the beginning of air recirculation operation in accordance with the experience values determined by tests.

By this means, the computer 12 "knows" at any time whether the pollutant concentrations of the internal air and the external air are approximately equal or whether either the internal air or the external air has a relatively lower pollutant concentration. The butterfly 10 can then be controlled in such a way that the quality of the internal air always remains optimal as a function of this "knowledge", i.e. as a function of a comparison which can be carried out by means of the computer 12.

If, for example, the pollutant concentration of the external air should suddenly increase greatly, air recirculation operation is switched on because, by this means, the result is less deterioration of the internal air than would be the case if the increasingly polluted external air were blown into the internal space 1 during air supply operation. If, however, the pollutant concentration in the external air only increases very gradually, the computer 12 is in a position to recognize that air supply operation provides advantages in this case because, with air recirculation operation, the quality of the internal air would now decrease more rapidly than would be the case with air supply operation supplying the gradually increasingly polluted external air to the internal space 1.

If, on the other hand, air recirculation operation has been switched on because of excessive pollutant concentration in the external air, it is still possible to maintain air recirculation operation, even if the pollutant concentration in the external air is decreasing again, because the computer 12 can "recognize" the fact that the pollutant concentration of the internal air due to the air recirculation operation is still small relative to the pollutant concentration in the external air and that switching on air supply operation would therefore introduce a deterioration in the internal air—even though the external air is improving again.

The mode of operation of the device according to the invention and of the method according to the invention becomes particularly clear in the case of travel through a tunnel. At the inlet to the tunnel, switch-over from the air supply operation, which will generally have been previously selected, to air recirculation operation will take place because of the rapidly deteriorating external air. If the pollutant concentration in the external air decreases again with the approach of the tunnel outlet, air recirculation operation is initially maintained, despite the improvement in the external air, until such time as the pollutant concentration in the external air has fallen to the vicinity of the calculated value for the pollutant concentration in the internal air or has fallen below this latter value.

The mode of operation of the computer 12 is explained below by way of example using the flow diagram shown in FIG. 2.

Figure 2:
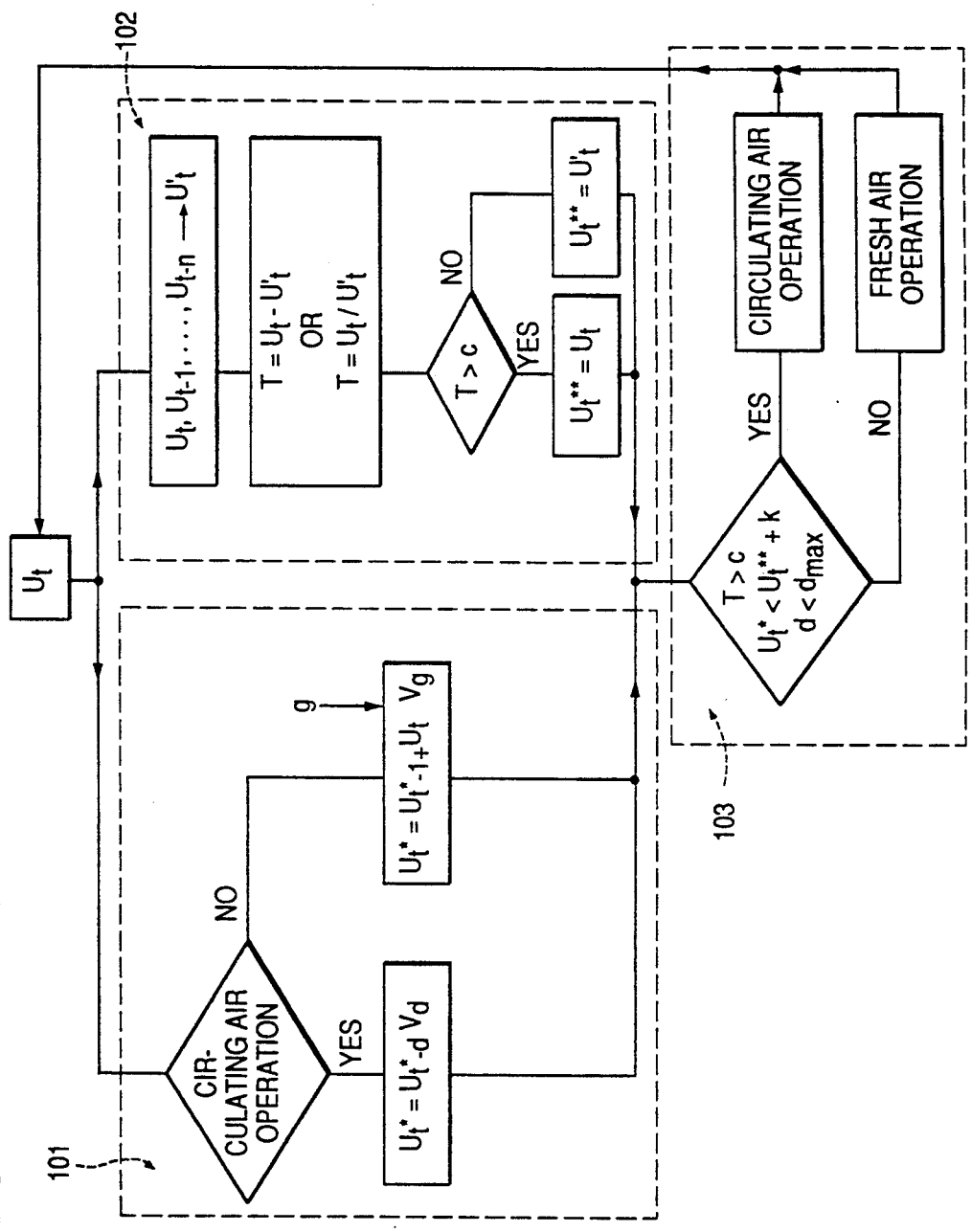
FIG. 2 shows a low diagram to explain the mode of operation of this system and FIG. 3 shows a sectioned diagram of a chamber which accommodates a pollutant sensor and which is closed relative to the external air by means of a gas-permeable membrane.

In accordance with the flow diagram shown in FIG. 2, the pollutant sensor 11 (see FIG. 1) reacting to the pollutant concentration in the external air generates, at an interrogation time t, a signal $U_t$ reproducing the pollutant concentration.

For the following considerations, it is assumed that the level of the signal $U_t$ or of the numerical value representing this signal increases with increasing pollutant concentration.

By means of the computer 12 (see FIG. 1), a signal or a numerical value $U_t^*$ is calculated from the sensor signal $U_t$, as shown in the section 101 of FIG. 2, this signal or numerical value $U_t^*$ representing the pollutant concentration of the internal air in the vehicle.

A signal or numerical value $U_t^{}$ is simultaneously generated from the sensor signal $U_t$ by means of the computer 12, as shown in section 102 of FIG. 2, this signal or numerical value $U_t^{}$ being subsequently compared with the signal or numerical value $U_t^*$ in section 103 of FIG. 2 in order to decide whether air recirculation operation or air supply operation should be switched on or retained.

The process described is then repeated with a renewed interrogation of the sensor signal $U_t$, etc.

The signal $U_t^*$ or the corresponding numerical value representing the pollutant concentration in the internal space can be determined, as shown in section 101, in the advantageous manner presented below.

The computer 12 is first interrogated as to whether the ventilation system is operating on recirculation or air supply. If air recirculation operation is present, $U_t^*$ is calculated as:

$$U_t^* = U_{t-1}^* + U_t V_g.$$

where d is the time interval which has elapsed since air recirculation operation was switched on for the last time, and $V_d$ represents a factor dependent on this time interval d and representing the actual and/or supposed increase in the pollutant concentration in the internal space with air recirculation operation. The factors $V_d$ represent experience values which are stored in the computer 12 or to which the computer 12 has access. If air recirculation is not in operation, i.e. if the ventilation system operates on air supply, $U_t^*$ is calculated as $$U_t^* = U_{t-1}^* + U_t V_g.$$

In this, $U_{t-1}^*$ is the signal or the corresponding numerical value representing the pollutant concentration which was calculated by the computer for the interrogation time $t-1$ previous to the time t. $V_g$ represents a factor which, on the one hand, depends on the strength of the current of air flowing into the internal space or the output g of the fan 4 representing this air current strength (see FIG. 1) and, on the other hand, on the size of the internal space of the vehicle. The factors $V_g$ again represent experience values which are stored in a manner accessible to the computer 12. If necessary, the factors $V_g$ can be different for different travelling speeds of the vehicle in order to take account of the fact that the supply of air into the internal space of the vehicle (in the case of air supply operation) also depends on the travelling speed. In this case, the computer 12 must receive additional signals representing the travelling speed in addition to signals giving the instantaneous output of the fan. In this way, the factors $V_g$ can take account of the fact that the changes in pollutant concentration in the internal space of the vehicle are delayed relative to the changes in the pollutant concentration in the external air because a complete change of the air in the internal space of the vehicle takes place relatively slowly (for example in approximately $\frac{1}{2}$ minute).

As shown in section 102 of FIG. 2, an average value $U'_t$ is determined from the signals $U_t$ of the pollutant sensor (see FIG. 1). For this purpose, sensor signals $U_{t-1}$ to $U_{t-n}$ interrogated at previous interrogation times $t-1$ to $t-n$ are taken into account in addition to the current sensor signal $U_t$; n is a specified integer. As an example, the arithmetic average can be formed from the sensor signals specified. A value T, which is a measure of the extent to which the pollutant concentration in the external air has a rising or falling tendency, is subsequently determined. As an example, T can be determined as $$T = U_t - U'_t$$

or $$T = U_t/U'_t.$$

Interrogation then takes place to determine whether the value of T is greater than a specified constant c. If this is the case, the pollutant concentration in the external air has a strongly rising tendency at the interrogation time t. In this case, $U_t^{}$ is determined as $$U_t^{} = U_t.$$

If, on the other hand, the value of T is less than the specified constant c, the pollutant concentration of the external air may have a moderately rising tendency but, generally speaking, will have a constant or even falling tendency. In this case, $U_t^{}$ is determined as $$U_t^{} = U'_t.$$

A comparison between $U_t^*$ and $U_t^{**}$ is now undertaken as shown in section 103 of FIG. 2 in order to decide on air recirculation operation or air supply operation. It is then preferable to examine three criteria. Air recirculation operation is then retained or switched on if all three criteria are simultaneously present.

The criteria to be examined include the interrogation of whether the value of T is greater than the constant c, i.e. whether the pollutant concentration in the external air has a strongly rising tendency. An examination is also carried out to determine whether $U_t^*$ is smaller than $U_t^{**}$ plus a specified small constant k, i.e. whether the pollutant concentration in the vehicle internal space determined by the computer is possibly slightly greater than the pollutant concentration of the external air. Finally, an investigation is also carried out to determine whether d is smaller than $d_{max}$, i.e. whether the time duration d for which air recirculation operation may have already been switched on is smaller than the threshold value $d_{max}$.

If the criteria quoted are present, air recirculation operation is switched on or is retained. Otherwise, air supply operation is switched on or is retained.

The processing of the signals $U_t$ shown in section 102 is particularly advantageous because it ensures that the system is switched over to air recirculation operation in good time when the pollutant concentration of the external air has a strongly rising tendency. On the other hand, the system is subsequently switched over to air supply operation only when an improvement to the internal air can be achieved in any event or when, by this means, the quality of the internal air will not be made worse. This simultaneously ensures a desirable switching hysteresis when switching between air recirculation and air supply operations, i.e. the sequence of corresponding switching operations cannot be arbitrarily rapid.

Otherwise, air supply operation is maintained once it has been switched on as long as the pollutant concentration of the external air only changes slowly.

Overall, therefore, the result is optimum operating behavior which can hardly be improved even by the intervention of the driver.

Figure 3:
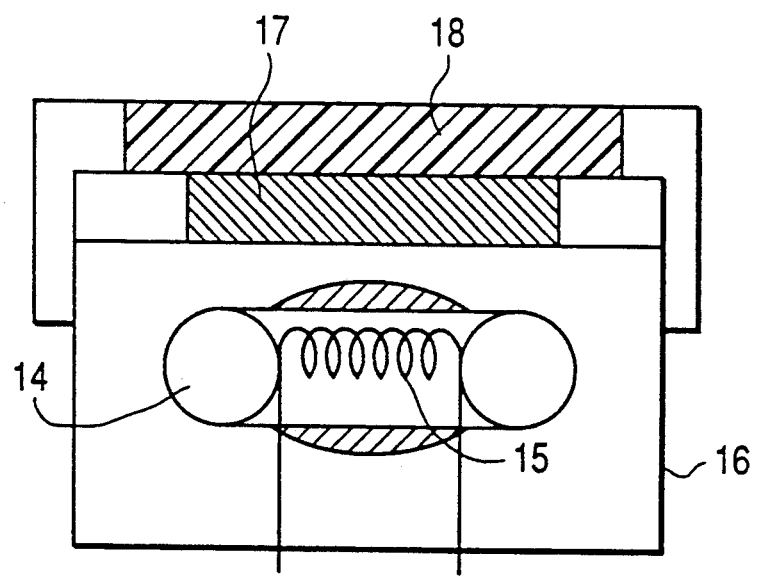

FIG. 3 shows a particular advantageous arrangement of a pollutant sensor. This consists essentially of a ceramic body 14 whose electrical resistance changes under the influence of pollutants as a function of their concentration. Because this effect is generally only sufficiently marked at fairly high temperatures, however, the ceramic body 14 has a heating device 15.

The ceramic body 14 and its heating device 15 are accommodated in a sensor casing 16, which is open at the top in FIG. 3, a steel net fabric 17 being located in the opening. Essentially, the latter has only a safety function and is intended to prevent contact with the possibly hot ceramic body 14 or the heating device 15. Otherwise, the opening of the sensor casing 16 is closed by a gas-permeable membrane 18, in Teflon for example.

Because the membrane 18 is gas-permeable, the composition of the atmosphere in the sensor casing 16 has practically the same composition as the atmosphere outside the sensor casing 16. However, the arrangement reliably prevents the ceramic body 14 or the heating device 15 of the pollutant sensor being subjected to strong air or gas flows and/or water droplets (in the case of rain or mist). This means in effect that constant operating conditions can be maintained in the sensor casing 16 to the greatest possible extent and, correspondingly, the sensor signals which can be generated change at most only to a trivial extent when the air or the gases outside the sensor casing 16 flow more slowly or more rapidly and/or the casing 16 is subjected to rain or mist. In this way, it is possible to ensure that the sensor signals are practically only dependent on the pollutant concentration of the surrounding air or gases.

In the example of FIG. 1, the sensor casing shown in FIG. 3 can be located in the inlet duct 8 in such a way that the internal space of the sensor casing 16 is shut off from the internal space of the inlet duct 8 by the membrane 18.

What is claimed is:

1. Device for controlling the ventilation of an internal space of a motor vehicle, comprising:
    sensor signal means for providing a sensor signal from a pollutant sensor essentially subjected only to external air;
    switch-over means for switching between air supply operation and air recirculation operation;
    computing means for processing said sensor signal according to a current mode of operation, air supply operation or air recirculation operation, and stored, pre-determined experience values, wherein a first quantity correlated with the pollutant concentration in the internal space is determined and is compared with a second quantity correlated with the pollutant concentration of the external air and derived from said sensor signal, and wherein either the air supply operation or the air recirculation operation is switched on or retained depending on the result of this comparison.

2. Device according to claim 1, wherein the second quantity reproducing the pollutant concentration of the external air or the signal representing the same is provided as pulses, a current last signal of the sensor or of its measured value being further processed for a strongly increasing tendency of the pollutant concentration in the external air, and an average value, which is formed taking account of a specified number of preceding values, being further processed in the case of moderately rising, constant or falling tendency of the pollutant concentration of the external air.

3. Device according to one of claim 1, wherein the experience values include a tendency of the air quality in the internal space to deteriorate with at least one of air recirculation operation a delayed equalization between the air quality in the internal space and the air quality of the external air occurring in the case of air supply operation, and a weakened equalization between the air quality in the internal space and the air quality of the external air occurring in the case of air supply operation.

4. Device according to one of claim 2, wherein the experience values include a tendency of the air quality in the internal space to deteriorate with at least one of air recirculation operation a delayed equalization between the air quality in the internal space and the air quality of the external air occurring in the case of air supply operation, and a weakened equalization between the air quality in the internal space and the air quality of the external air occurring in the case of air supply operation.

5. Device according to one of claim 1, wherein a signal reproducing the quality of the internal air corresponds to the signal representing the pollutant concentration of the external air pollutant concentration at which the current quality of the internal air remains unaltered or cannot be improved.

6. Device according to one of claim 3, wherein a signal reproducing the quality of the internal air corresponds to the signal representing the pollutant concentration of the external air pollutant concentration at which the current quality of the internal air remains unaltered or cannot be improved.

7. Device according to claims 1, wherein said sensing means includes a sensor located in a casing having walls that are permeable, at least in some areas, to gases and to the pollutants to be monitored.

8. Device according to claim 5, wherein said sensing means includes a sensor located in a casing having walls that are permeable, at least in some areas, to gases and to the pollutants to be monitored.

9. Device according to claim 7, wherein the otherwise closed casing has at least one opening which is closed by a gas-permeable membrane.

10. Device according to claim 8, wherein the otherwise closed casing has at least one opening which is closed by a gas-permeable membrane.

11. Device according to claim 7, wherein the otherwise closed casing has at least one opening which is closed by a mat.

12. Device according to claim 8, wherein the otherwise closed casing has at least one opening which is closed by a mat.

* * * * *